Patented Nov. 2, 1937

2,097,672

UNITED STATES PATENT OFFICE 2,097,672

ANTHRAQUINONE DERIVATIVES

Frank Lodge, Blackley, Manchester, England, assignor to Imperial Chemical Industries Limited, a corporation of Great Britain No Drawing. Application September 4, 1934, Serial No. 742,581. In Great Britain September 6, 1933

4 Claims. (Cl. 260—60)

It is known that certain derivatives of aminoanthraquinone yield on halogenation products which can be condensed with amines to form substituted diaminoanthraquinone derivatives. The condensation of amines with halogenated anthraquinonesulphonic acids such as can be obtained by halogenating an anthraquinonesulphonic acid in the presence of concentrated or fuming sulphuric acid with or without a halogen carrier is described in British patent specification No. 27,187/07. Such a method of halogenation leads according to my experiments to the entrance of halogen only in the non-sulphonated nucleus of the anthraquinone system. On amination, therefore, the product can never contain the 1-amino-2-sulphonic acid grouping characteristic of the products of my invention.

According to this invention an N-substituted 1-aminoanthraquinone-2-sulphonic acid, carrying as N-substituents one or two alkyl, aryl and/or aralkyl groups such as may be obtained for example by the process of British patent specification No. 399,528, is halogenated by known general methods and the halogenation product is treated with an unsulphonated primary or secondary amine so as to replace the new halogen by a substituted amino group.

The invention is illustrated but not limited by the following example in which the parts are by weight:

Example 10 parts of 4-bromo-1-methylaminoanthraquinone-2-potassium sulphonate, which may be obtained by brominating 1-methylaminoanthraquinone-2-potassium sulphonate, are dissolved in 200 parts water and stirred at 80° C. for 8 hours with 15 parts sodium bicarbonate, 10 parts p-toluidine and 0.2 part copper acetate. The mixture is then cooled, acidified and filtered. The new dyestuff is dissolved in water, neutralized with soda ash, filtered from any insoluble matter and salted out. It dyes wool in blue shades. The solution in sulphuric acid is green.

Other 4-halogeno-derivatives (e. g. the chloro derivatives) may be similarly prepared and condensed with a primary or secondary amine. Suitable primary and secondary amines are aniline, chloroanilines, bromoanilines, toluidines, chlorotoluidines, xylidines, methylamine, dimethylamine, ethylamine, diethylamine, mono- and dibutylamines, hydroxyethylamine, benzylamine, chlorobenzylamines, and other aliphatic, aromatic or araliphatic primary and secondary amines free from sulphonic groups.

The 1-amino-group of the anthraquinone compound used as starting-material may carry either one or two substituents which may belong to the aliphatic, aromatic or araliphatic series, e. g. 1-methylamino-, 1-dimethylamino-, 1-anilino-, 1-methylanilino-, 1-benzylamino-, 1-ethylbenzylamino, 1-diethylamino-, 1-propylamino-, or 1-hydroxyethylamino-anthraquinone-2-sulphonic acids may be used.

I claim:

1. As a new composition of matter a 1-alkylamino-4-arylamino-2-anthraquinonesulfonic acid.

2. Process for the manufacture of 4-arylamino-1-alkylaminoanthraquinone-2-sulphonic acids which comprises brominating a 1-alkylamino-anthraquinone-2-sulphonic acid followed by replacement of the bromine by an arylamine group by interaction with an arylamine.

3. Process for the manufacture of 4-p-toluidino-1-methylaminoanthraquinone-2-sulphonic acid which comprises condensing 4-bromo-1-methylamino-anthraquinone-2-sulphonic acid with p-toluidine in the presence of an acid-absorber and a copper catalyst.

4. As a new composition of matter 4-p-toluidino-1-methylaminoanthraquinone-2-sulphonic acid.

FRANK LODGE.